United States Patent [19]

Zato

[11] Patent Number: 4,465,902

[45] Date of Patent: Aug. 14, 1984

[54] DIGITAL SPACE PHONE SYSTEM

[75] Inventor: Thomas J. Zato, Palatine, Ill.

[73] Assignee: Zenith Electronics Corporation, Glenview, Ill.

[21] Appl. No.: 433,344

[22] Filed: Oct. 8, 1982

[51] Int. Cl.³ .......................................... H04M 11/00
[52] U.S. Cl. ............................... 179/2 TV; 179/81 B; 179/100 L; 358/85
[58] Field of Search ................... 179/2 R, 2 TV, 81 B, 179/100 L, 84 T; 358/85; 381/110, 107, 108, 57, 94

[56] References Cited

U.S. PATENT DOCUMENTS

| | | | |
|---|---|---|---|
| 3,660,603 | 5/1972 | Andersen | 179/81 B |
| 3,925,618 | 12/1975 | Kato et al. | 179/81 B |
| 3,953,676 | 4/1976 | Brown | 179/81 B |
| 4,338,492 | 7/1982 | Snopko | 179/2 TV |
| 4,414,432 | 11/1983 | Skerlos et al. | 179/2 TV |

FOREIGN PATENT DOCUMENTS 97262  6/1982  Japan .................................. 179/81 B

*Primary Examiner*—Gene Z. Rubinson
*Assistant Examiner*—W. J. Brady

[57] ABSTRACT

A television receiver having two-way telephone capability includes a digitized talk channel and a digitized listen channel each having a gain-controlled amplifier selectively controlled by a switch controlled generator driven by the output of a subtraction circuit. Multipliers are connected to the inputs of the subtraction circuit and in turn receive respective inputs from their associated channels and from the other channels for offsetting cross coupled signals due to the telephone interface.

10 Claims, 1 Drawing Figure

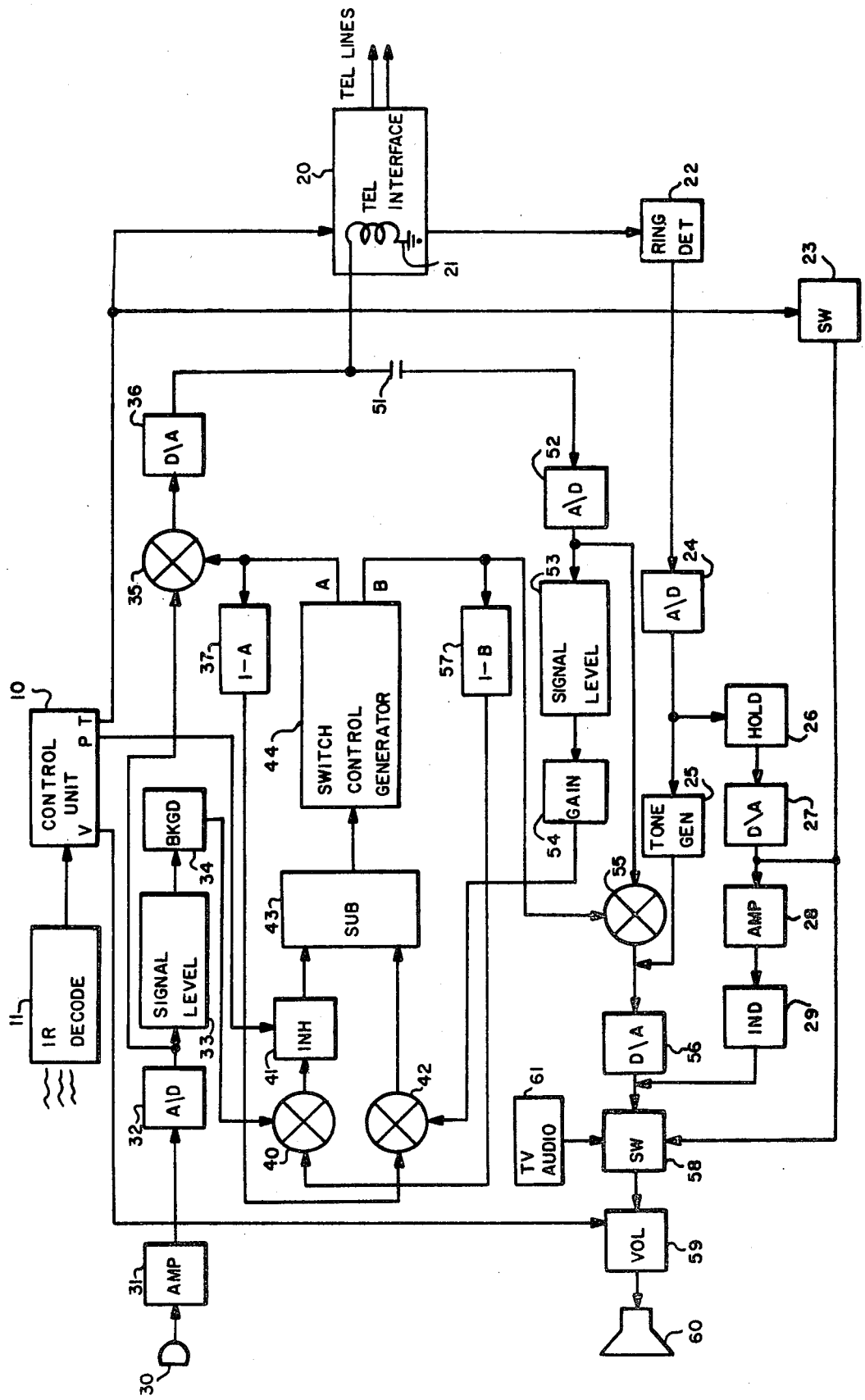

DIGITAL SPACE PHONE SYSTEM

BACKGROUND OF THE INVENTION

This invention relates to improvements in television receivers having two-way telephone communication capability.

Television receivers having two-way telephone communication capability are known in the art. U.S. Pat. No. 4,338,492 issued July 6, 1982 to Paul A. Snopko and assigned to Zenith Radio Corporation describes a commercially available system that enables a TV viewer to answer or initiate a telephone call through an operating television receiver. The receiver is equipped with a remotely operated switch enabling the receiver to be switched to a telephone mode. The telephone mode switching function is an added feature on a conventional hand-held wireless remote control unit for selecting and adjusting various television receiver functions.

A major limitation in such telephone arrangements results from the configuration of the telephone line, which is essentially two wires and an induction coil. Any system for supplying signals to the induction coil and for receiving signals from the induction coil will inherently experience a large amount of cross coupling. Prior art systems, including the Zenith system above, had to some degree succeeded in solving the problem of cross coupling, generally by including bridge circuit input/output arrangements and various controls for "tweaking" the telephone interface circuitry to particular line characteristics. Unfortunately, telephone lines differ in impedance and noise characteristics. While for any given set of line characteristics the interface circuit and amplifiers may be optimally adjusted to minimize cross talk, less than optimum performance will be obtained for different sets of line characteristics.

In a two-way telephone communication system through a television receiver the talk and listen channels are selectively operable, that is only one channel is operable at a time. When the talk channel is in use, the listen channel is disabled and vice versa. A channel switching arrangement controls channel switching with the strongest signal being the determinant. Difficulties with channel lock-out (a condition where the "non-operating channel" signal cannot overcome the "operating channel" signal) and too rapid switching of channels led to incorporation of compromise time constant networks to permit the non-operating channel to obtain control a predetermined time after the operating channel was no longer receiving a signal.

Another major problem is cross talk caused by a signal in one channel feeding into the other channel which also results in rapid switching and generally unstable conditions. To help counteract this problem a signal threshold is imposed on the disabled channel, requiring the signal in the non-operating channel to have a minimum amplitude to cause channel switching.

Difficulties are still encountered despite the use of circuits with time constants and thresholds. For example, large noises may cause channel switching and lockout the other channel for a substantial time depending on the time constant of the circuit. In practice, a "listener" might cough loudly and switch channels, thus cutting off the "talker". The system would stay switched, keeping the talker cut off for a time period determined by the channel time constant and the signal level of the talker. Thus, conversation may be arbitrarily interrupted for a varying time period, resulting in not only unsatisfactory communication, but also very unnatural communication.

Similar difficulties arise because of background noise, especially at the microphone end. Often the background noise level is sufficiently high to make it extremely difficult for the listening channel to become operative and also make it very annoying for the person at the other end of the telephone line to listen to the conversation. A mediocre or poor quality telephone connection can also to impose serious conversational difficulties, because of weak or noisy signals, in the listen channel. (To simplify terminology, the terms "listen channel" and "talk channel" are arbitrarily referenced to the television receiver location).

The listen channel is therefore preferably provided with greater sensitivity than the talk channel, the characteristics of which are much more controllable. However, since the signal level in the listen channel may not be representative of the signal level delivered from the speaker of the television receiver, optimally establishing the sensitivities of the talk and listen channels becomes extremely difficult. This, of course, is because the television speaker volume is primarily under the control of the viewer and only incidentally under the control of the other party on the telephone line.

Despite the various techniques mentioned above and the use of thresholds in an attempt to compensate for cross talk inherent in a telephone line, prior art systems often fall far short of desired performance levels.

OBJECTS OF THE INVENTION

The principal object of this invention is to provide a television receiver having two-way telephone communication capability which obviates many of the problems of the prior art.

A further object of this invention is to provide a television receiver having two-way telephone communication capability that compensates for telephone line cross coupling.

SUMMARY OF THE INVENTION

In accordance with the invention a television receiver having two-way telephone communication capability includes a talk channel and a listen channel coupled to a telephone line which introduces substantial cross coupling between the channels, channel control means selectively controlling the gains of the channels as a function of the signals in the channels and for offsetting cross coupled signals in the channels.

BRIEF DESCRIPTION OF THE DRAWING

Further objects and advantages of the invention will be apparent from a reading of the following description of the preferred embodiment thereof in conjunction with the single FIGURE of the drawing which depicts a block diagram of the invention.

DESCRIPTION OF THE PREFERRED EMBODIMENT

Referring to the drawing, a television receiver (not shown) preferably has its various functions such as channel selection, on-off and volume change, controlled from a remote position by means of a hand-held control unit (not shown). Such control units commonly use different frequency infrared (IR) command signals for initiating the desired functions. An IR decode unit 11 is shown for receiving transmitted IR command signals and effecting a desired function in a control unit 10. Control unit 10 may include a number of functions as mentioned above as well as include appropriate tuning circuitry for television signals. It specifically includes three outputs, one marked V (volume), another marked P (privacy) and a third marked T (telephone). While the control unit will usually have additional outputs, only the three mentioned ones are of interest to this invention.

The T output of control unit 10 is connected to a switch 23 and to a telephone interface circuit 20 which includes a conventional telephone induction coil 21 and suitable means such as a hook switch relay (not shown), for disconnecting the telephone ring circuit and connecting the telephone talk circuit across the telephone lines. The ring circuit (not shown) supplies a ring detector 22, which is responsive to the 20 Hz ringing signal commonly used in telephone systems. The ring detector is coupled to an analog to digital (A/D) detector 24 where the 20 Hz ring signal is "digitized" and supplied to a tone generator 25 and a holding circuit 26. The output of the holding circuit is supplied to a digital to analog (D/A) converter 27 where the digitized signal is converted to an analog signal and supplied to an amplifier 28 and used to drive a visual indicator 29. The signal indicator may be a LED (light-emitting diode), for example. The output of a D/A converter 27 is also used to control switch 58 during an incoming ring signal.

Switch 23 is connected to another switch 58 in the listen channel. Switch 58 has two signal inputs, one from the normal television audio circuit 61 and the other from the output of a D/A converter 56 of the listen channel. The output of tone generator 25, which is simply a sine wave oscillator, is approximately a 600 Hz signal. This signal is supplied during an incoming ring signal to the input of a D/A converter 56 and consequently operation of switch 58 disconnects the normal TV audio signal and connects the tone generator signal to a volume control 59 in an amplifier which drives a speaker 60.

The television viewer is alerted to an incoming telephone call by an audible ring signal from the television speaker and by visual indicator 29. The viewer "answers" the telephone by sending the appropriate IR command signal for energizing the T output of control unit 10 to operate the mechanism in telephone interface circuit 20. The ringing circuit is switched out and the induction coil connected across the telephone lines and switch 23 operates, resulting in switch 58 operating to connect the listen channel to the audio output circuitry of the television receiver.

The talk channel includes a microphone 30 supplying an amplifier 31, the output of which is coupled to an A/D converter 32 where the amplified analog microphone signal is digitized, that is, has discrete numerical values assigned to various amplitude levels. The output of A/D converter 32 is sent directly to a gain-controlled amplifier or multiplier 35 having its output supplied to a D/A converter 36, which reconverts the signal into analog form and supplies it to induction coil 21 in telephone interface 20. The output of A/D converter 32 is also supplied to a signal level detector 33 which in turn has an output supplied to a background noise cancelling circuit 34. The output of background circuit 34 is supplied to the input of a variable gain amplifier (multiplier) 40. While both gain-controlled amplifier 35 and variable gain amplifier 40 are multipliers, use of different names is believed to help in understanding the description and the claims. The other input to variable gain amplifier 40, as will be seen, is supplied from the listen channel. The output of variable gain amplifier 40 is supplied to an inhibit circuit 41 which is coupled to the P output of control unit 10. The viewer may energize this ouptut by an appropriate IR command signal when it is desired to keep sounds in the room picked up by microphone 30 from being coupled to the telephone lines.

The output of inhibit circuit 41 is supplied as one input to a substraction circuit 43, the other input of which comes from the listen channel. Subtraction circuit 43 develops an output based upon the larger of its two input signals and supplies an appropriate switching signal to a switch control generator 44 which has two outputs A and B. Outputs A and B are selectively energized, with output A controlling the gain of gain-controlled amplifier 35 in the talk channel and output B controlling the gain of gain-controlled amplifier 55 in the listen channel. Output A is also coupled to a scaling circuit 37 for controlling the gain of variable gain amplifier 42. Similarly output B is coupled to a scaling circuit 57 for controlling the gain of variable gain amplifier 40. The scaling circuits are designated 1-A and 1-B which means that the digital signals on outputs A and B are subtracted from 1. The digital signals at outputs A and B vary from 0 to 1.

The listen channel is connected to induction coil 21 in the telephone interface through a DC blocking capacitor 51 which supplies analog signals to an A/D converter 52 which digitizes them. The output of the A/D converter is directly supplied to gain-controlled amplifier 55 which, in turn, supplies D/A converter 56, as explained previously. The output of A/D converter 52 is also supplied to a signal level detector 53 similar to signal level detector 33 in the talk channel. The output of detector 53, however, is supplied to an amplifier 54 prior to being supplied to an input of variable gain amplifier 42. The output of amplifier 42 is, as noted before, supplied to subtraction circuit 43.

The additional amplifier 54 in the listen channel is included to increase the sensitivity of the listen channel since it is subject to many more variables such as signal level, noise, line losses, etc. and as mentioned previously is considered to be uncontrollable in comparison with the talk channel.

The magnitude of the signal on output A or on output B of switch control generator 44 determines the gain of the respective gain-controlled amplifiers 35 and 55. Switch control generator 44 selectively energizes outputs A and B which are normally at digital 0 indicating that the multipliers to which they are connected are substantially disabled.

When a signal is received in the talk or in the listen channel, its associated gain-controlled amplifier is enabled and the signal is translated through the channel. Since only one of the talk and listen channels is enabled at any one time, channel control means are provided for switching the channels as a function of signals therein. These channel control means include scaling circuits 37 and 57, variable gain amplifiers 40 and 42, differential means, in the form of subtraction circuits 43, and switch control generator 44.

The channel control means of the invention senses the signal level in a channel and increases the gain of that channel as a function of the sensed signal level and offsets cross coupled signals by desensitizing the other channel. Consequently, rather than trying to "null out"

the inherent cross coupling in the telephone lines, the invention simply nullifies its effect by offsetting cross coupling signals. For example, a strong signal in the talk channel will result in high gain in that channel and a correspondingly large cross coupled signal in the listen channel. The gain control factor (A) applied to the gain-controlled amplifier in the talk channel is scaled and the resultant (1-A) gain factor "multiplied" with the signal level in the listen channel and applied to the subtraction circuit. The signal level in the talk channel is multiplied by the scaled gain control factor of the listen channel (1-B) which is very close to 1 and applied to the subtraction circuit. The output of the subtraction circuit determines which channel is on and at what gain factor.

Since the system is digitized and microprocessor based, it is extremely predictable and fast-acting with decay times of very short duration to enable rapid, but controlled, switching.

No adjustments are provided for "tweaking" to a particular telephone line since the system is independent of the telephone line parameters, specifically the degree of cross coupling in the line.

With the system of the invention, the threshold of prior art circuits is eliminated and cross coupled signals are offset. Weak signals are offset slightly and strong signals are offset strongly. Digitizing the signals yields extremely accurate amplitude levels and predictable results. The very high speed gain control and switching yields a television receiver two-way communication channel that approaches the performance of a conventional telephone system. The system is capable of switching the channels in mid-syllable.

By way of further detail, signal level detectors 33 and 53 may each comprise an absolute value detector circuit in series with a peak detector circuit which, in turn, supplies a decay circuit of approximately 100 milliseconds. This particular combination has been found to be well suited to normal speech. Background noise cancelling circuit 34 may be incorporated for those situations where relatively constant noise signals are present such as when an air conditioner is running. This circuit may comprise a very long time constant filter, on the order of 0.1 Hz, and an override arrangement to enable quick response in the event that the constant background noise source is suddenly turned off. One approach would include a substraction circuit that is supplied with the long time constant output from the filter and with the output of the 100 millisecond decay circuit in the signal level detector. The output of the subtraction circuit would be supplied to a comparator along with the direct output of the 100 millisecond decay circuit with the comparator output constituting the output of the background noise cancellation circuit. Such an arrangement precludes background noise from desensitizing the other channel and avoids the difficulty inherent in using long time constant filters which are incapable of responding to changes in background noise.

Switch control generator 44 may comprise a parallel arrangement of a positive peak detector, a negative peak detector and a zero crossing detector. The peak detectors supply the input of a pair of "decay to zero" circuits of approximately 100 millisecond duration and the zero crossing detector supplies a reset for the decay circuits.

A computer program is attached as an appendix.

What has been described is a television receiver with improved two-way telephone communication capability. It is recognized that numerous modifications and changes in the described embodiment of the invention will be apparent to those skilled in the art without departing from the true spirit and scope of the invention as defined in the claims.

What is claimed is:

1. A television receiver having two-way telephone communication capability comprising:
   a talk channel and a listen channel coupled to a telephone line, said telephone line introducing substantial cross coupling between said channels;
   an A/D converter in each said channel for digitizing signals in said channels;
   a gain controlled amplifier in each said channel; and
   channel control means for selectively controlling the gains of said channel as a function of the difference in signal levels in said channels and for offsetting cross coupled signals in said channels, said channel control means including;
   differential means comparing the signal levels in the channels and developing an output as a function of the comparison;
   a switch control generator for adjusting the gains of the channels in accordance with the output of the differential means; and
   a variable gain amplifier, associated with each channel and having an output coupled to a respective input of the differential means and two inputs, one input being responsive to the signal level in the talk channel and another input being responsive to the signal level in the listen channel.

2. A television receiver as set forth in claim 1 wherein said switch control generator has a pair of outputs, each of which is connected to the gain-controlled amplifier in its associated channel and to the input of the variable gain amplifier in the other channel.

3. A television receiver as set forth in claim 2 wherein the signal level fed to the other channel is equal to A and the signal level fed to the gain-controlled amplifier in said associated channel is equal to (1-A).

4. A television receiver as set forth in claim 3 wherein the sensitivity of said talk channel is less than the sensitivity of said listen channel.

5. A television receiver as set forth in claim 4 further including:
   noise cancelling means in said talk channel, the input to said gain-controlled amplifier in said talk channel being taken from the input of said noise cancelling means and the input to its associated variable gain amplifier in said channel control means being taken from the output of said noise cancelling means.

6. A television receiver as set forth in claim 5 wherein said noise cancelling means has a long time constant to compensate for relatively constant background noise signals in said talk channel.

7. A television receiver having two-way telephone communication capability comprising:
   a talk channel having an output circuit, including a microphone responsive to sound adjacent to the television receiver, coupled to a telephone line;
   a listen channel having an output circuit coupled to said telephone line, and being connectable to the television audio system, said telephone line introducing substantial cross coupling between said channels;

A/D converter means for digitizing output analog signals from said microphone and from said telephone line;

a gain-controlled amplifier and a D/A converter in the output circuits of each said talk channel and said listen channel; and channel control means selectively controlling the gains of said gain-controlled amplifiers as a function of the digitized signal in said channels and for offsetting cross coupled signals in said channels, said channel control means including:

differential means, having a pair of inputs each of which is connected to receiver signals in said talk channel and in said listen channel;

a switch control generator for selectively adjusting the gains of said gain-controlled amplifiers in accordance with the output of said differential means; and a variable gain amplifier associated with each channel, and having an output coupled to the input of said differential means and two inputs, one input being responsive to signal levels in the talk channel and the other input being responsive to signal levels in the listen channel.

8. A television receiver as set forth in claim 7 further including:

ring detector means responsive to a ringing signal from said telephone line;

oscillator means coupled to said ring detector means for generating an audible signal in response thereto; and means supplying said audible signal to said audio system in said television receiver.

9. A television receiver as set forth in claim 8 further including:

means for disabling said microphone for precluding sounds adjacent to said television receiver from being coupled into said talk channel.

10. A television receiver as set forth in claim 9 wherein said talk channel, said listen channel and said channel control means are microprocessor based.

* * * * *